(12) United States Patent
Schimmels et al.

(10) Patent No.: US 9,341,074 B2
(45) Date of Patent: May 17, 2016

(54) ACTIVE CLEARANCE CONTROL MANIFOLD SYSTEM

(71) Applicant: General Electric Company, Schenectady, NY (US)

(72) Inventors: Scott Alan Schimmels, Miamisburg, OH (US); Daniel John Fusinato, Cincinnati, OH (US); John Carl Glessner, Kings Mills, OH (US); Dan Nicholas Mirkovich, Liberty Township, OH (US); Robert Proctor, West Chester, OH (US)

(73) Assignee: General Electric Company, Schenectady, NY (US)

( * ) Notice: Subject to any disclaimer, the term of this patent is extended or adjusted under 35 U.S.C. 154(b) by 650 days.

(21) Appl. No.: 13/743,818

(22) Filed: Jan. 17, 2013

(65) Prior Publication Data

US 2014/0030066 A1    Jan. 30, 2014

Related U.S. Application Data

(60) Provisional application No. 61/675,396, filed on Jul. 25, 2012.

(51) Int. Cl.
| | | |
|---|---|---|
| *F01D 11/24* | (2006.01) | |
| *F01D 25/12* | (2006.01) | |
| *F01D 25/14* | (2006.01) | |

(52) U.S. Cl.
CPC ............... *F01D 11/24* (2013.01); *F01D 25/12* (2013.01); *F01D 25/14* (2013.01); *F05D 2200/33* (2013.01); *F05D 2260/201* (2013.01); *F05D 2260/30* (2013.01); *Y02T 50/676* (2013.01)

(58) Field of Classification Search
CPC ......... F01D 11/24; F01D 25/12; F01D 25/14; F05D 2260/30; F05D 2260/201; Y02T 50/675
See application file for complete search history.

(56) References Cited

U.S. PATENT DOCUMENTS

| | | | |
|---|---|---|---|
| 4,013,376 A | 3/1977 | Bisson et al. | |
| 4,019,320 A | 4/1977 | Redinger, Jr. et al. | |

(Continued)

FOREIGN PATENT DOCUMENTS

GB        2217788 A    11/1989

OTHER PUBLICATIONS

Wikipedia "Active tip-clearance control," retrieved from https://en.wikipedia.org/wiki/Active_clearance_control on Jul. 6, 2012.

(Continued)

*Primary Examiner* — Ninh H Nguyen
(74) *Attorney, Agent, or Firm* — General Electric Company; William Scott Andes

(57) ABSTRACT

Active clearance control systems for gas turbine engines are disclosed. An example active clearance control system may include a generally circumferentially mounted spray tube comprising a plurality of impingement holes arranged to impinge thermal control air on a clearance control component of a case; a rigid mounting assembly substantially rigidly coupling the spray tube to the case; and/or a sliding mounting assembly coupling the spray tube to the case while permitting limited relative movement between the spray tube and the case in a direction generally parallel with an engine axis. The sliding mount may be coupled to the case generally axially forward of the rigid mount. A ratio of the stand-off distance to the impingement hole diameter may be less than about 8. A ratio of the arc spacing to the impingement hole diameter may be less than about 15.

19 Claims, 7 Drawing Sheets

(56) References Cited

U.S. PATENT DOCUMENTS

| | | | |
|---|---|---|---|
| 4,279,123 A | 7/1981 | Griffin et al. | |
| 4,329,114 A | 5/1982 | Johnston et al. | |
| 4,525,998 A | 7/1985 | Schwarz | |
| 4,576,547 A | 3/1986 | Weiner et al. | |
| 4,826,397 A | 5/1989 | Shook et al. | |
| 5,012,420 A | 4/1991 | Walker et al. | |
| 5,100,291 A * | 3/1992 | Glover | F01D 11/24 165/169 |
| 5,205,115 A | 4/1993 | Plemmons et al. | |
| 5,205,708 A * | 4/1993 | Plemmons | F01D 11/08 299/446 |
| 5,219,268 A | 6/1993 | Johnson | |
| 5,273,396 A | 12/1993 | Albrecht et al. | |
| 5,281,085 A | 1/1994 | Lenahan et al. | |
| 5,399,066 A | 3/1995 | Ritchie et al. | |
| 5,540,547 A * | 7/1996 | Cole | F01D 11/24 24/339 |
| 6,035,929 A | 3/2000 | Friedel et al. | |
| 6,139,257 A | 10/2000 | Proctor et al. | |
| 6,185,925 B1 | 2/2001 | Proctor et al. | |
| 6,779,597 B2 * | 8/2004 | DeMarche | F01D 11/24 165/169 |
| 6,863,495 B2 | 3/2005 | Halliwell et al. | |
| 6,896,038 B2 | 5/2005 | Arilla et al. | |
| 6,997,673 B2 | 2/2006 | Morris et al. | |
| 7,287,955 B2 | 10/2007 | Amiot et al. | |
| 7,309,209 B2 | 12/2007 | Amiot et al. | |
| 7,503,179 B2 | 3/2009 | Estridge et al. | |
| 7,597,537 B2 | 10/2009 | Bucaro et al. | |
| 8,092,146 B2 | 1/2012 | Legare et al. | |
| 8,197,186 B2 | 6/2012 | Dong et al. | |
| 2005/0158169 A1 | 7/2005 | Amiot et al. | |
| 2009/0004002 A1 | 1/2009 | Dong et al. | |

OTHER PUBLICATIONS

Wikipedia "Roll forming," retrieved from https://en.wikipedia.org/wiki/Roll_form on Jul. 12, 2012.

Search Report and Written Opinion from PCT/US2013/046501 dated Sep. 18, 2013.

* cited by examiner

ACTIVE CLEARANCE CONTROL MANIFOLD SYSTEM

CROSS REFERENCE TO RELATED APPLICATION

This application claims the benefit of U.S. Provisional Application No. 61/675,396, filed Jul. 25, 2012, which is incorporated by reference herein in its entirety.

BACKGROUND

The subject matter disclosed herein relates generally to gas turbine engines, and, more specifically, to active clearance control systems for gas turbine engines.

In some gas turbine engines, such as those used to propel aircraft, some aspects of engine performance may depend upon clearances between turbine blade tips and static seals or shrouds surrounding the blade tips. For example, excessive blade tip clearances may adversely affect thrust, specific fuel consumption, and/or exhaust gas temperature margin.

Some gas turbine engines may use active clearance control to adjust turbine blade tip clearances at various engine operating conditions. For example, some active clearance control systems may be configured to direct relatively cool or relatively hot air, which may be generally referred to as thermal control air, onto high or low pressure turbine casings to cause the casings to thermally expand away from the blade tips (increasing the tip clearances) or contract (reducing the tip clearances).

The problems: Some active clearance control systems may be ineffective at controlling blade tip clearances due to limited heat transfer capacity and/or some active clearance control systems may adversely affect engine performance due to their use of relatively large amounts of thermal control air.

BRIEF DESCRIPTION

At least one solution for the above-mentioned problem(s) is provided by the present disclosure to include example embodiments, provided for illustrative teaching and not meant to be limiting.

An example active clearance control system for a gas turbine engine according to at least some aspects of the present disclosure may include a generally circumferentially mounted spray tube comprising a plurality of impingement holes arranged to impinge thermal control air on a clearance control component of a case. An individual impingement hole may have an impingement hole diameter. An individual impingement hole of the spray tube may be spaced apart from the clearance control component by a stand-off distance. A ratio of the stand-off distance to the impingement hole diameter may be less than about 8.

An example active clearance control system for a gas turbine engine according to at least some aspects of the present disclosure may include a generally circumferentially mounted spray tube comprising a plurality of impingement holes arranged to impinge thermal control air on a clearance control component of a case. A first individual impingement hole may have an impingement hole diameter. The first individual impingement hole may be spaced apart from a circumferentially adjacent second individual impingement hole by an arc spacing. A ratio of the arc spacing to the impingement hole diameter may be less than about 15.

An example active clearance control system for a gas turbine engine according to at least some aspects of the present disclosure may include a generally circumferentially mounted spray tube comprising a plurality of impingement holes arranged to impinge thermal control air on a clearance control component of a case; a rigid mounting assembly substantially rigidly coupling the spray tube to the case; and/or a sliding mounting assembly coupling the spray tube to the case while permitting limited relative movement between the spray tube and the case in a direction generally parallel with an engine axis. The sliding mount may be coupled to the case generally axially forward of the rigid mount. A first individual impingement hole may have an impingement hole diameter. The first individual impingement hole may be spaced apart from the clearance control component by a stand-off distance. The first individual impingement hole may be spaced apart from a circumferentially adjacent second individual impingement hole by an arc spacing. A ratio of the stand-off distance to the impingement hole diameter may be less than about 8. A ratio of the arc spacing to the impingement hole diameter may be less than about 15.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
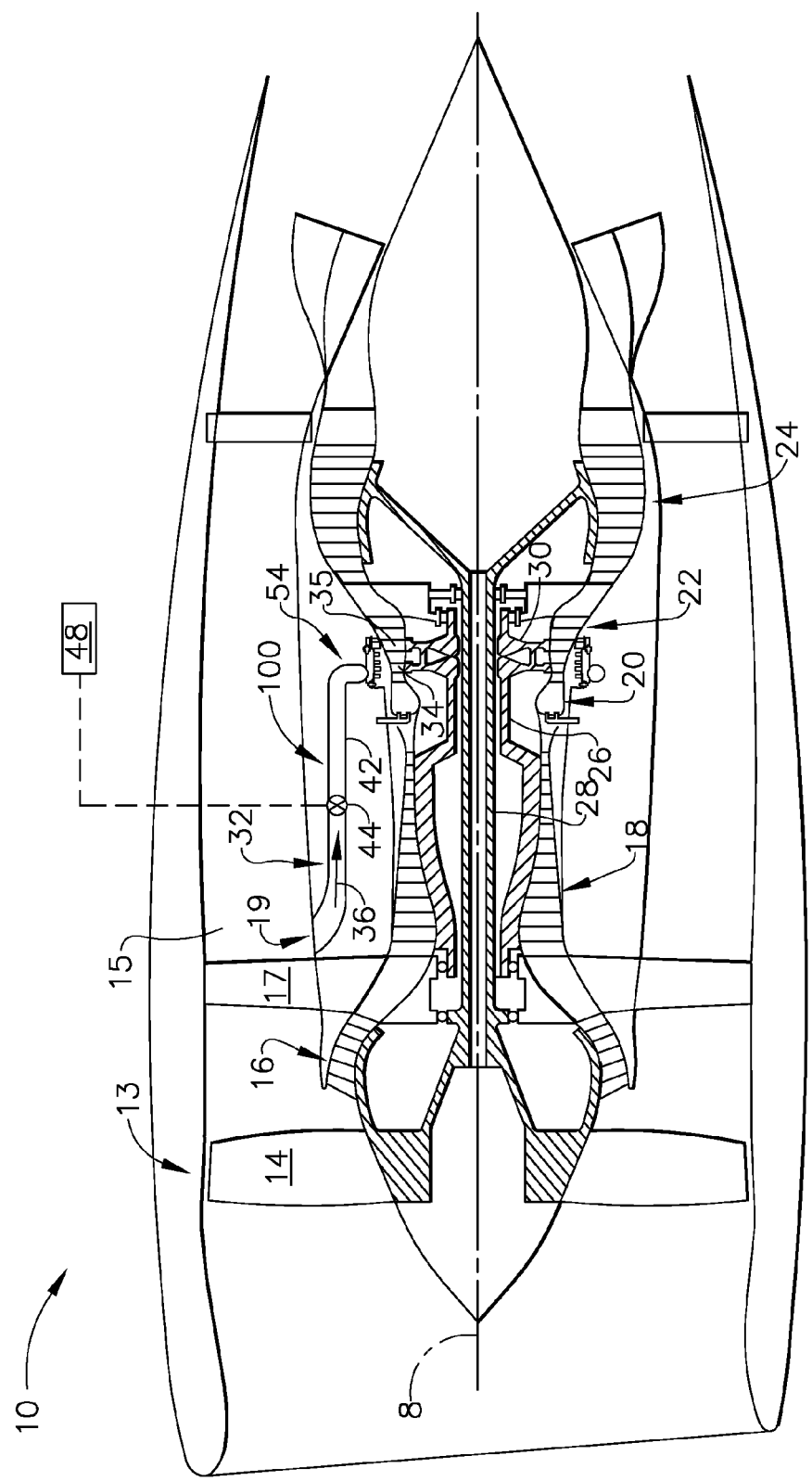
FIG. 1 is a schematic cross section view of an aircraft gas turbine engine including an example active clearance control system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, gas turbine engines, and, more specifically, active clearance control systems for gas turbine engines.

FIG. 1 is a schematic cross section view of an aircraft gas turbine engine 10 including an example active clearance control (ACC) system 100, according to at least some aspects of the present disclosure. Engine 10 may include, in a downstream serial flow relationship, a fan section 13 including a fan 14, a booster or low pressure compressor (LPC) 16, a high pressure compressor (HPC) 18, a combustion section 20, a high pressure turbine (HPT) 22, and/or a low pressure turbine (LPT) 24. A high pressure shaft 26 may be disposed about an engine axis 8 and may drivingly connect HPT 22 to HPC 18. A low pressure shaft 28 may drivingly connect LPT 24 to LPC 16 and/or fan 14. HPT 22 may include HPT rotor 30, which may comprise a plurality of first stage turbine blades 34 and second stage turbine blades 35 mounted at a periphery of rotor 30.

In some example embodiments according to at least some aspects of the present disclosure, a compressed fan air supply 32 may be used as a source of thermal control air 36, which may be supplied to ACC system 100 via an air supply tube 42. An air valve 44 disposed in air supply tube 42 may control the amount of thermal control air 36 flowed therethrough. Thermal control air 36 supplied via compressed fan air supply 32 may act as cooling air for ACC system 100. Thermal control air 36 may be controllably flowed from a fan bypass duct 15 through air supply tube 42 to a distribution manifold 54 of ACC system 100. Air valve 44 may be controlled by a controller 48, such as a digital electronic engine control system often referred to as a full authority digital engine control (FADEC). In some example embodiments, an air supply inlet 19 to air supply tube 42 may be located downstream of exit guide vanes 17 disposed in fan bypass duct 15 downstream of fan 14.

Figure 2:
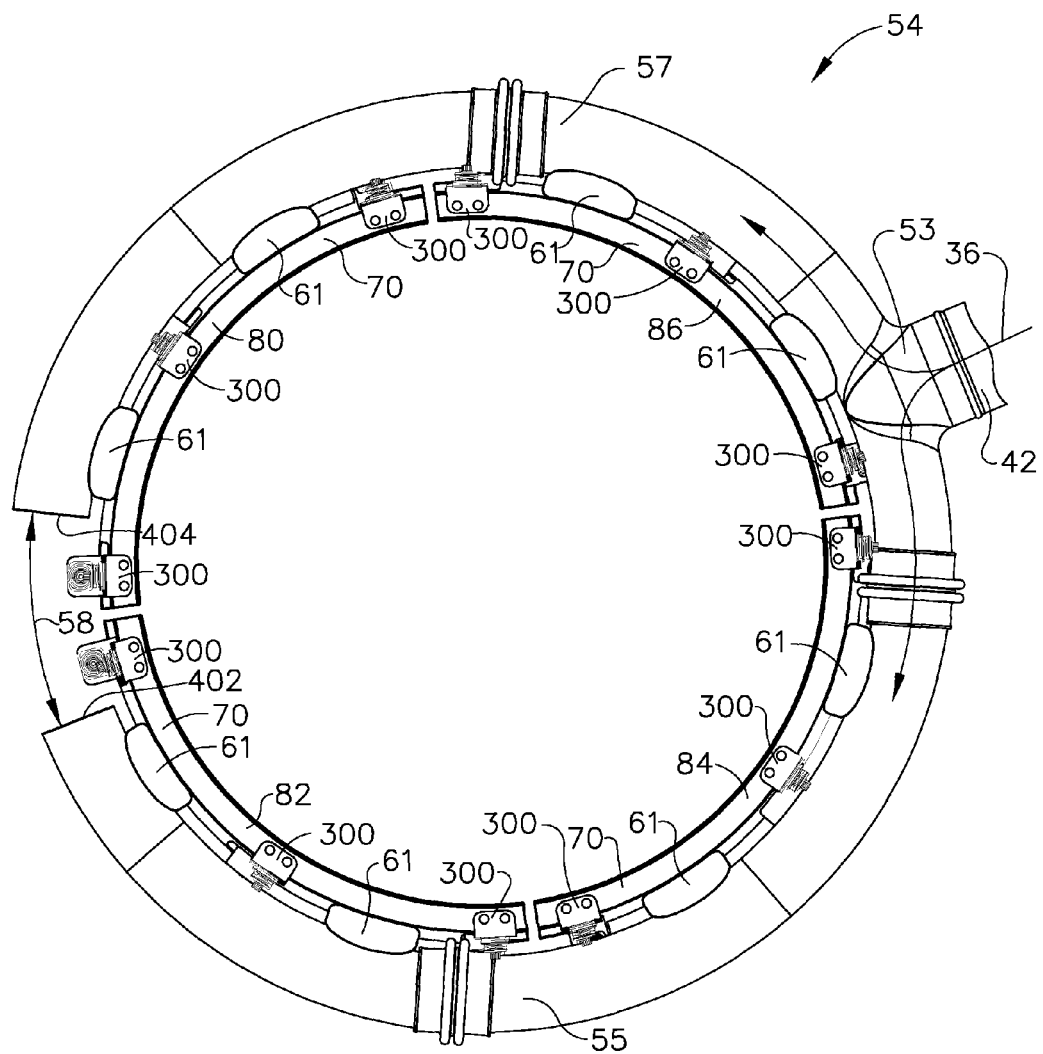
FIG. 2 is an axial view of an example air distribution manifold.
Figure 3:
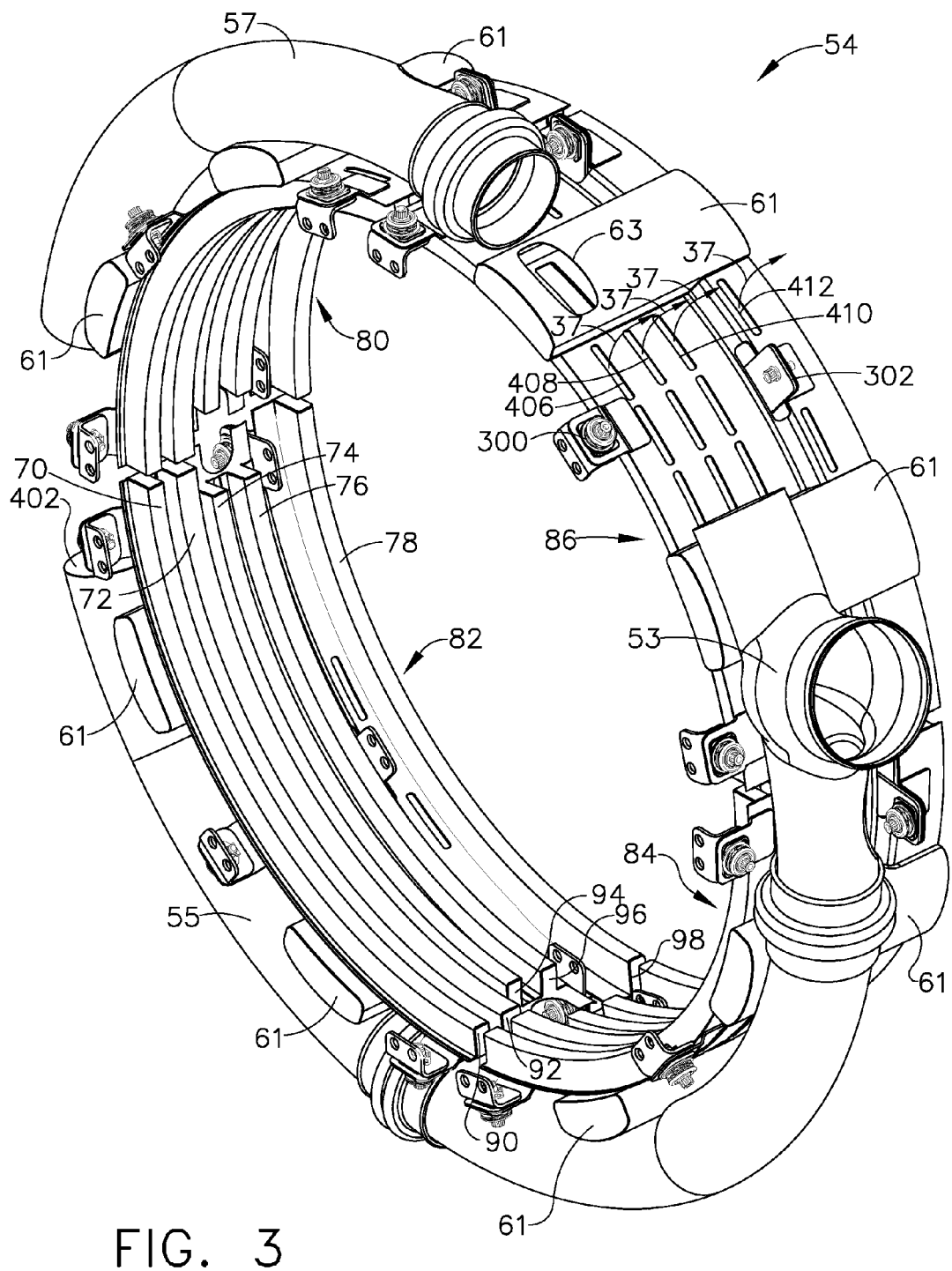
FIG. 3 is a partial cutaway perspective view of an example air distribution manifold.
Figure 4:
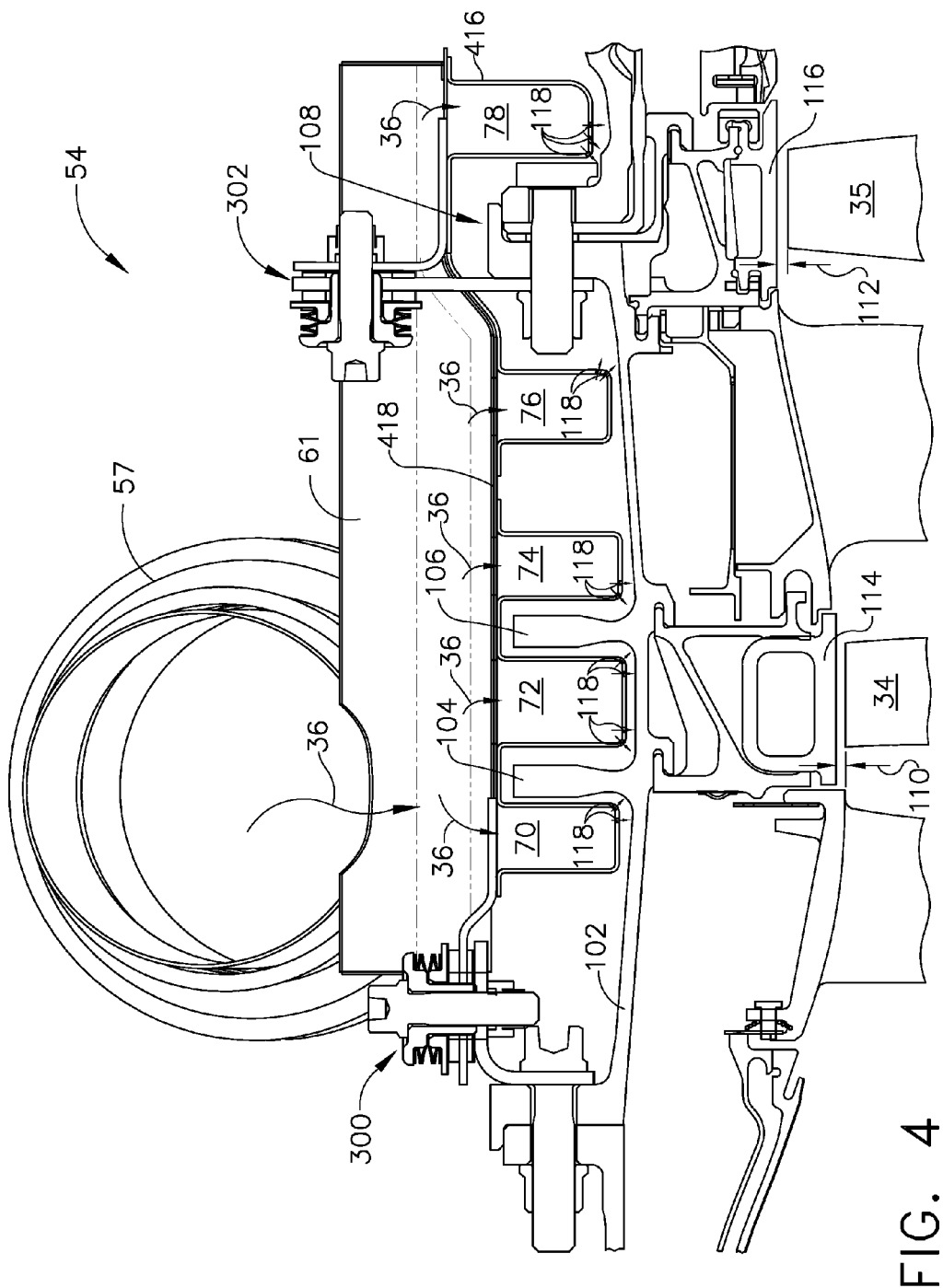
FIG. 4 is a cross section view of an example air distribution manifold.
Figure 5:
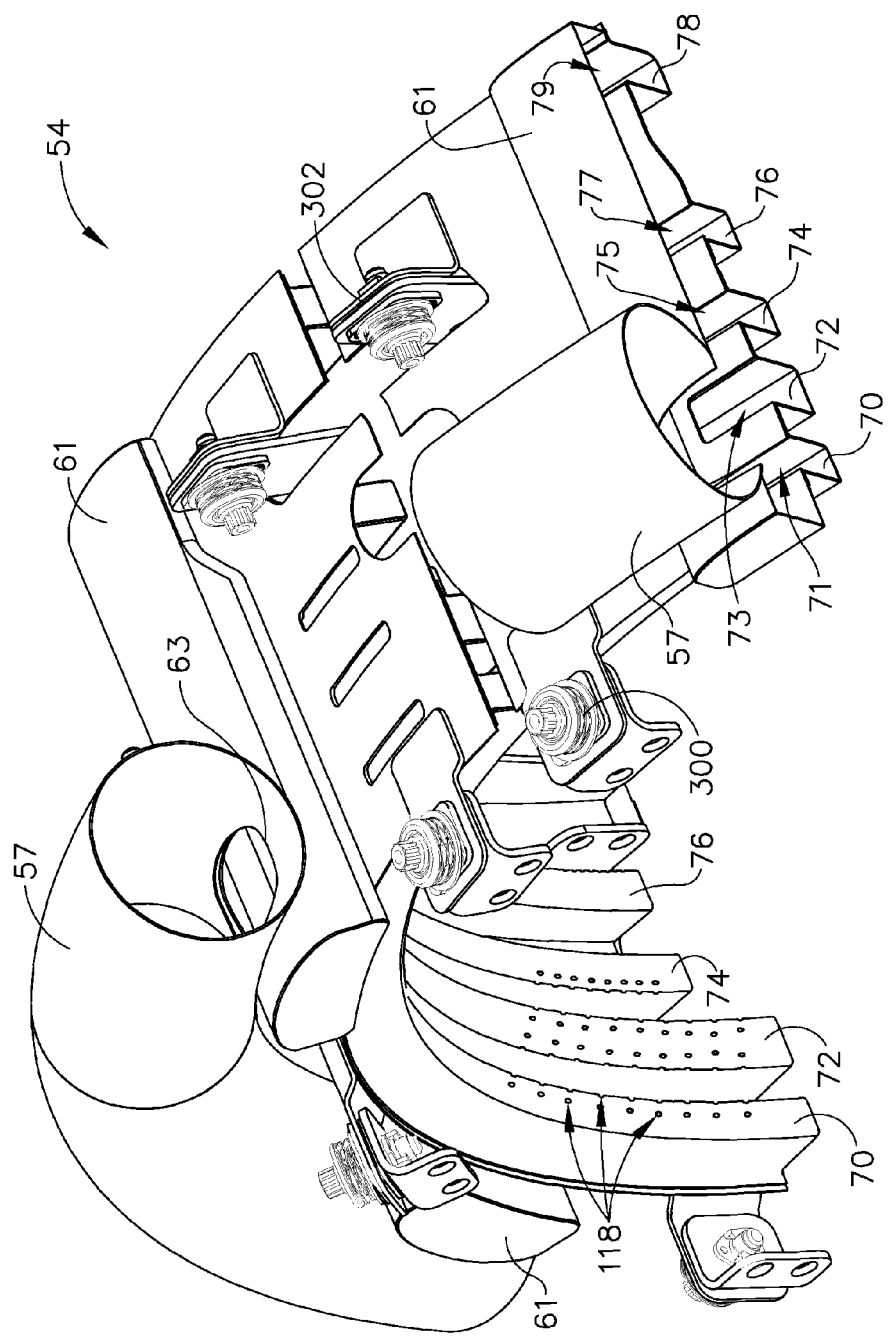
FIG. 5 is a detailed partial cutaway perspective view of an example air distribution manifold.

FIG. 2 is an axial view of example air distribution manifold 54, according to at least some aspects of the present disclosure. FIG. 3 is a partial cutaway perspective view of example air distribution manifold 54, according to at least some aspects of the present disclosure. FIG. 4 is a cross section view of example air distribution manifold 54, according to at least some aspects of the present disclosure. FIG. 5 is a detailed partial cutaway perspective view of an example air distribution manifold 54, according to at least some aspects of the present disclosure.

Referring to FIGS. 2-5, an example air distribution manifold 54 may receive thermal control air 36 from air supply tube 42. Air distribution manifold may include one or more conduits, such as first distribution pipe 55 and/or second distribution pipe 57, which may be disposed generally circumferentially around HPT 22 (FIG. 1). First distribution pipe 55 and/or second distribution pipe 57 may be constructed in the form of generally cylindrical tubing, which may form a generally toroidal shape about engine axis 8. In some example embodiments, the generally toroidal shape may be interrupted, such as by a gap 58 between downstream ends of first distribution pipe 55 and second distribution pipe 57, which may be closed. Each of first distribution pipe 55 and second distribution pipe 57 may comprise a generally tubular arc which forms part of the generally toroidal shape.

In some example embodiments, first distribution pipe 55 and/or second distribution pipe 57 may receive thermal control air 36 from air supply tube 42 via a tee 53. For example, tee 53 may comprise an inlet fluidicly coupled to air supply tube 42, a lateral, generally circumferentially oriented outlet fluidicly coupled to first distribution pipe 55, and a lateral, generally circumferentially oriented outlet fluidicly coupled to second distribution pipe 57.

In some example embodiments, first distribution pipe 55 and/or second distribution pipe 57 may be fluidicly coupled to one or more air distribution headers 61. For example, first distribution pipe 55 may be arranged to supply thermal control air 36 to four headers 61 and/or second distribution pipe 57 may be arranged to supply thermal control air to four headers 61, for a total of eight headers 61. First distribution pipe 55 and/or second distribution pipe 57 may supply thermal control air 36 to one or more corresponding air distribution headers 61 via an opening 63 providing a flow path from the interior of first distribution pipe 55 and/or second distribution pipe 57 into the interior of header 61.

In some example embodiments, first distribution pipe 55 and/or second distribution pipe 57 may include respective end walls 402, 404 associated with circumferential ends of first distribution pipe 55 and/or second distribution pipe 57. End walls 402, 404 may substantially seal the circumferential ends first distribution pipe 55 and/or second distribution pipe 57, respectively, substantially preventing leakage of thermal control air 36.

In some example embodiments, individual headers 61 may be generally tubular and/or may be oriented generally parallel with engine axis 8. Other than opening 63 (connecting to first distribution pipe 55 or second distribution pipe 57) and openings 71, 73, 75, 77, 79 (discussed below) associated with spray tubes 70, 72, 74, 76, 78 (discussed below), individual headers 61 may be substantially sealed, substantially preventing leakage of thermal control air 36.

In some example embodiments, an individual header 61 may be fluidicly coupled to one or more spray tubes 70, 72, 74, 76, 78. Individual spray tubes 70, 72, 74, 76, 78 may extend generally radially inwardly from headers 61 and/or may run generally circumferentially at least partially around engine axis 8. An individual header 61 may supply thermal control air to one or more corresponding spray tubes 70, 72, 74, 76, 78 via respective openings 71, 73, 75, 77, 79.

In some example embodiments, one or more spray tubes 70, 72, 74, 76, 78 may be provided in one or more panels 80, 82, 84, 86. For example, spray tubes 70, 72, 74, 76, 78 may be provided in four panels 80, 82, 84, 86, each of which forms an arc extending approximately one quarter of the circumference (e.g., about 90 degrees) around engine axis 8. Spray tubes 70, 72, 74, 76, 78 may include respective end walls 90, 92, 94, 96, 98 associated with circumferential ends of panels 80, 82, 84, 86. End walls 90, 92, 94, 96, 98 may substantially seal the circumferential ends of spray tubes 70, 72, 74, 76, 78, substantially preventing leakage of thermal control air 36.

In some example embodiments, at least some components of panels 80, 82, 84, 86 may be constructed using roll forming. For example, spray tubes 70, 72, 74 may be at least partially constructed of a roll-formed channel 414. Spray tubes 76, 78 may be at least partially constructed of roll-formed channel 416. Channels 414, 416 may be joined to curved sheet 418 to substantially enclose spray tubes 70, 72, 74, 76, 78. For example, curved sheet 418 may provide a radially outward wall of spray tubes 70, 72, 74, 76, 78. Although alternative construction techniques may be used, roll forming may provide channels 414, 416 with small-radius corners as well as relatively low weight and cost.

In some example embodiments, one or more spray tubes 70, 72, 74, 76, 78 may be configured to direct thermal control air 36 onto one or more clearance control components via one or more impingement holes 118. For example, HPT case 102 may include one or more thermal control rings 104, 106 (also referred to as pseudo-flanges) and/or one or more bolted flanges 108 extending radially outwardly therefrom. Thermal control air 36 from one or more spray tubes 70, 72, 74, 76, 78 may impinge on thermal control rings 104, 106, bolted flange 108 (e.g., on axially forward and/or aft facing surfaces), and/or case 102 near thermal control rings 104, 106 and/or bolted flange 108. Generally, thermal control rings 104, 106, bolted flange 108, and/or case 102 near control rings 104, 106 and/or bolted flange 108 may be referred to herein as clearance control components.

Generally, in some example embodiments, spray tubes 70, 72, 74, 76, 78 may be located relatively close to the clearance control components. As a result, impingement holes 118 may be relatively small, which may allow use of a relatively small amount of thermal control air 36 to achieve desired heat transfer from the clearance control components. In other words, some example embodiments may provide improved ACC muscle (deflection of case 102 due to impingement of thermal control air 36) while using a smaller amount of thermal control air 36 than prior designs.

In some example embodiments, thermal control air 36 may be directed to impinge at or near where thermal control rings 104, 106 and/or bolted flange 108 join generally cylindrical portions of case 102. Thermal control rings 104, 106, bolted flange 108, and/or case 102 near thermal control rings 104, 106 and/or bolted flange 108 may be configured to contract radially inward and/or expand radially outward in response to changes in temperature, such as changes in temperature caused at least in part by impingement of thermal control air 36 thereon. In some example embodiments, at least some thermal control air 36 may be directed to impinge on radially outward facing surfaces of thermal control rings 104, 106 and/or bolted flange 108.

In some example embodiments, radial movement of thermal control rings 104, 106 and/or associated portions of case 102 may affect first stage turbine blade 34 tip clearance 110 and/or radial movement of bolted flange 108 may affect second stage turbine blade 35 tip clearance 112. For example, contraction (e.g., due to cooling) of thermal control rings 104, 106 may cause radially inward movement of shroud 114 associated with first stage turbine blades 34, thereby reducing tip clearance 110. Contraction (e.g., due to cooling) of bolted flange 108 and/or associated portions of case 102 may cause radially inward movement of shroud 116 associated with second stage turbine blades 35, thereby reducing tip clearance 112. Conversely, expansion (e.g., due to heating) of thermal control rings 104, 106 and/or bolted flange 108 may cause radially outward movement of respective shrouds 114, 116, thereby causing respective tip clearances 110, 112 to increase.

In some example embodiments, first distribution pipe 55, second distribution pipe 57, headers 61, and/or spray tubes 70, 72, 74, 76, 78 may be configured to supply a generally uniform amount of thermal control air 36 around the circumference of case 102. Uniformly distributed thermal control air 36 may contribute to even thermal expansion or contraction of case 102, which may be associated with minimal circumferential distortion.

In some example embodiments, a pressure ratio across impingement holes 118 (e.g., the pressure upstream of impingement holes 118 in spray tubes 70, 72, 74, 76, 78 over the pressure downstream of impingement holes 118 near case 102) may be greater than about 1.3. In some example embodiments, the pressure ratio across impingement holes 118 may be greater than about 1.4. In some example embodiments, the pressure ratio across impingement holes 118 may be about 1.5. To provide desired pressure ratios across impingement holes 118, various upstream components may be configured to provide relatively small pressure drops. For example, air supply inlet, air supply tube 42, air valve 44, first distribution pipe 55, second distribution pipe 57, headers 61, and/or spray tubes 70, 72, 74, 76, 78 may be configured individually and collectively to impose a small pressure drop from fan bypass duct 15 to impingement holes 118. For example, tee 53 may include rounded and/or flared corners in the flow path of thermal control air 36, which may reduce the imposed pressure drop.

In some example embodiments, exhaust air 37 (e.g., thermal control air 36 that has been discharged from spray tubes 70, 72, 74, 76, 78 via impingement holes 118) may be vented through panels 80, 82, 84, 86 via one or more exhaust slots 406, 408, 410, 412. For example, panels 80, 82, 84, 86 may include exhaust slots 406, 408, 410, 412 having a total flow area that is at least about two times the total flow area of impingement holes 118. In some example embodiments, panels 80, 82, 84, 86 may include exhaust slots 406, 408, 410, 412 having a total flow area that is about three times the total flow area of impingement holes 118. In some example embodiments, panels 80, 82, 84, 86 may include exhaust slots 406, 408, 410, 412 having a total flow area that is about four times the total flow area of impingement holes 118. In some example embodiments, providing appropriate post-impingement venting, such as via exhaust slots 406, 408, 410, 412, may reduce or substantially eliminate cross-flow degradation losses associated with impingement holes 118. In some example embodiments, pressures within spray tubes 70, 72, 74, 76, 78 may be sufficiently higher than pressures surrounding case 102 that additional flow restrictions (e.g., baffles) through which exhaust air 37 must flow may not be necessary.

Some example embodiments may include one or more pseudo-flanges (e.g., generally similar to thermal control rings 104, 106) associated with shroud 116 of second stage turbine blades 35. Such pseudo-flanges may be used in addition to and/or instead of bolted flange 108.

Figure 7:
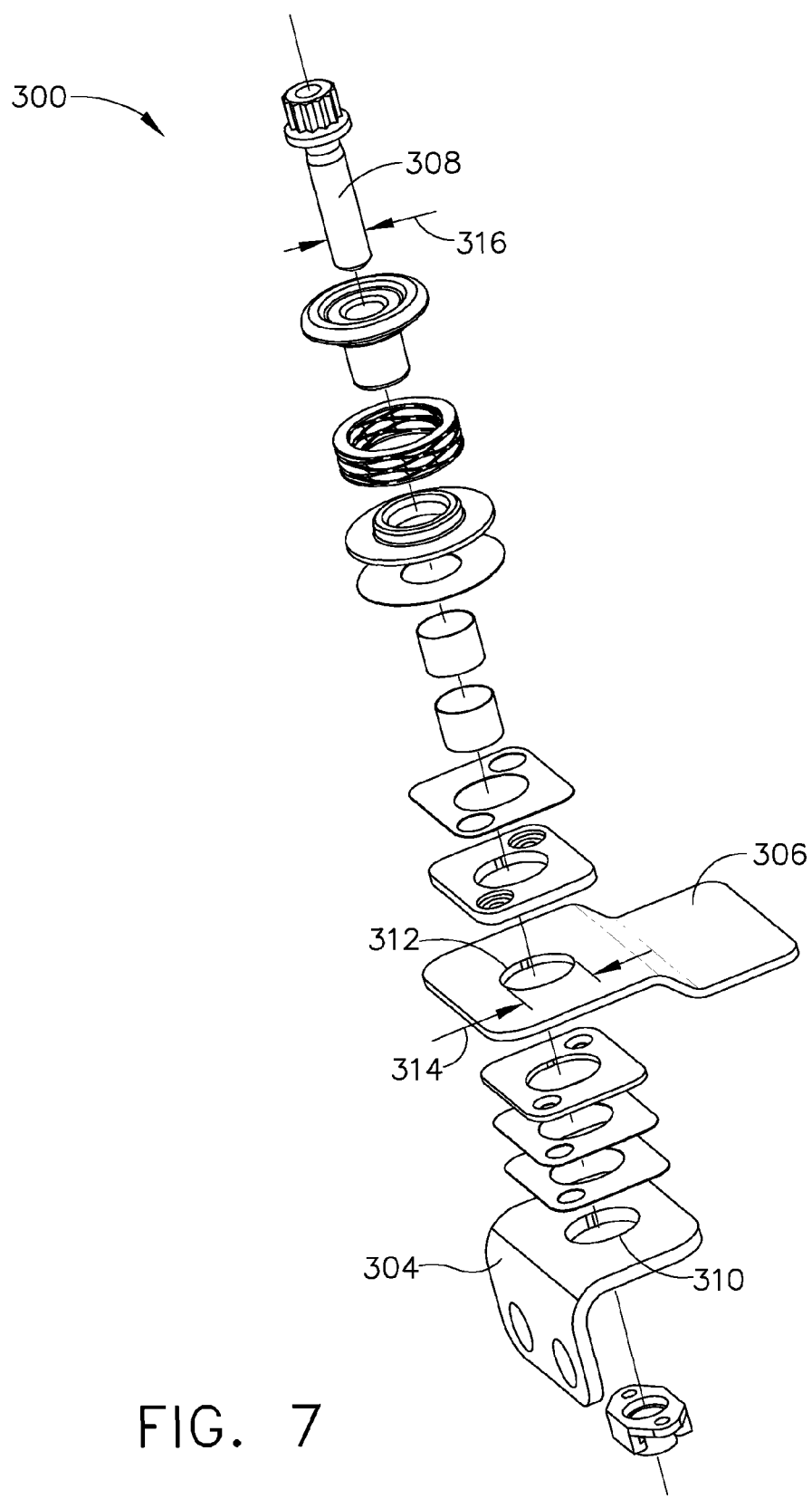
FIG. 7 is an exploded perspective view of an example sliding mounting assembly, all in accordance with at least some aspects of the present disclosure.

In some example embodiments, distribution manifold 54 may be mounted to case 102 using one or more mounting assemblies 300, 302. For example, individual panels 80, 82, 84, 86 may be mounted to case 102 using a plurality (e.g., three) sliding mounting assemblies 300 and/or a plurality (e.g., three) rigid mounting assemblies 302. In some example embodiments, one or more sliding mounting assemblies 300 may be disposed on a generally axially forward portion of panels 80, 82, 84, 86 and/or one or more rigid mounting assemblies 302 may be disposed on a generally axially aft portion of panels 80, 82, 84, 86. An example sliding mounting assembly 300 is illustrated in FIG. 7 and is described below. In some example embodiments, using rigid mounting assemblies 302 at generally axially aft portions of panels 80, 82, 84, 86 may improve assembly tolerances for gaps between spray tubes 76, 78 and bolted flange 108, while providing sufficient control of assembly tolerances for gaps between spray tubes 70, 72, 74 and thermal control rings 104, 106.

Figure 6:
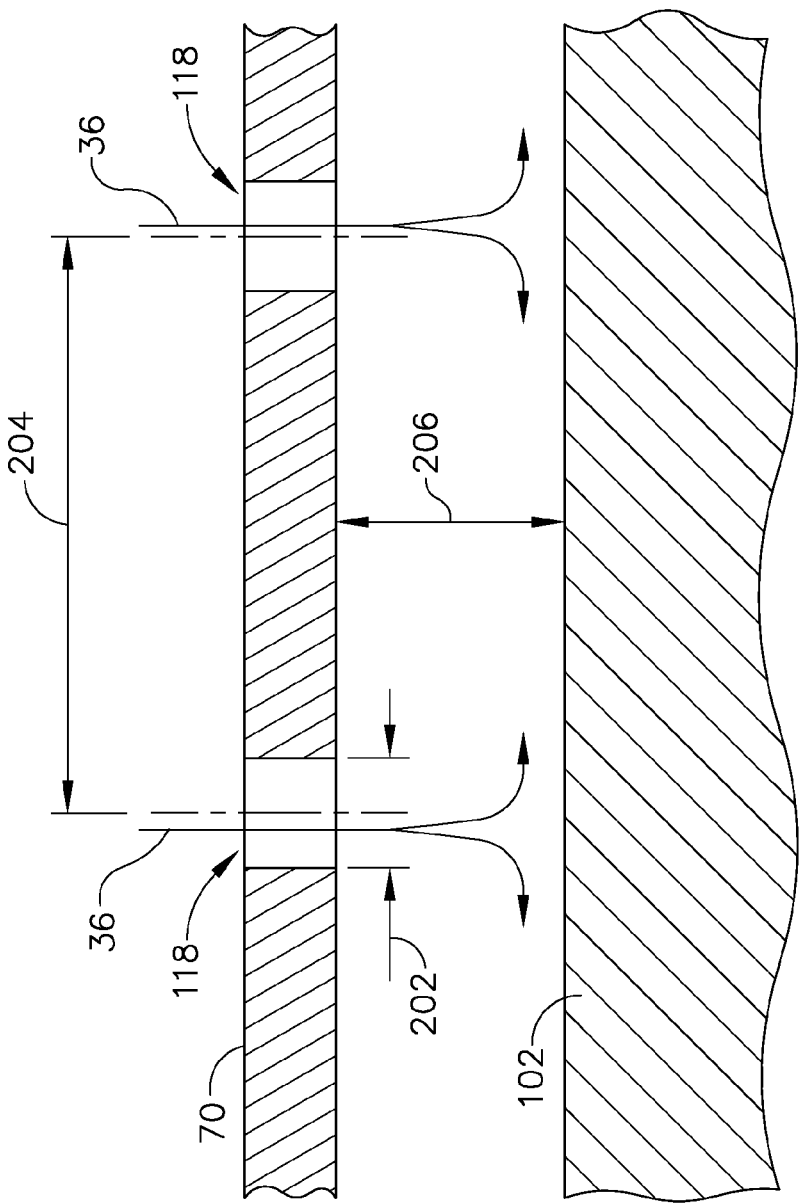
FIG. 6 is a detailed cross section view of example impingement holes.

FIG. 6 is a detailed cross section view of example impingement holes 118, according to at least some aspects of the present disclosure. Impingement holes 118, such as impingement holes extending through spray tube 70, may have a diameter 202 (D) and/or an arc spacing 204 ($X_n$) (e.g., measured center-to-center in a generally circumferential direction with respect to engine axis 8). Impingement holes 118 may be spaced apart from an impingement surface, such as case 102, by a stand-off distance 206 ($Z_n$).

In some example embodiments, a ratio of stand-off distance 206 ($Z_n$) to impingement hole diameter 202 (D), $Z_n/D$, may be less than about 8. In some example embodiments, $Z_n/D$, may be less than about 5. In some example embodiments, $Z_n/D$, may be less than about 3.

In some example embodiments, a ratio of arc spacing 204 ($X_n$) to impingement hole diameter 202 (D), $X_n/D$, may be less than about 15. In some example embodiments, $X_n/D$, may be between about 2 and about 9. In some example embodiments, $X_n/D$, may be between about 4 and about 7.

In some example embodiments, ratios $Z_n/D$ and/or $X_n/D$ may

In some example embodiments, impingement holes 118 may be generally circular. In some example embodiments, impingement holes 118 may be non-circular (e.g., generally oval, square, triangular, etc.). For non-circular impingement holes 118, impingement hole diameter 202 (D) for purposes of ratios $Z_n/D$ and/or $X_n/D$ may be determined by calculating effective hole diameter using known fluid dynamics methods.

FIG. 7 is an exploded perspective view of an example sliding mounting assembly 300, according to at least some aspects of the present disclosure. Sliding mounting assembly 300 may comprise a case bracket 304 (which may be rigidly mounted to case 102), a panel bracket 306 (which may be rigidly mounted to panel 80, 82, 84, 86), and/or a fastener 308 (e.g., bolt and associated nut) operatively coupling case bracket 304 and panel bracket 306. case bracket 304 and/or panel bracket 306 may include a respective fastener hole 310, 312 through which fastener 308 may extend. One or more of fastener holes 310, 312 may be larger than fastener 308 in at least one dimension, which may permit limited relative movement between case bracket 304 and panel bracket 306. For example, fastener hole 312 in panel bracket 306 may have an axial length 314 (e.g., generally parallel with engine axis 8 (FIG. 1)) that may be substantially larger than a diameter 316 of fastener 308. Such an example sliding mounting assembly 300 may permit limited relative axial movement between case 102 and panel 80, 82, 84, 86 (e.g., generally parallel with engine axis 8 (FIG. 1)). Some example sliding mounting assemblies 300 may include various washers, bushings, spacers, etc.

In some example embodiments according to at least some aspects of the present disclosure, thermal control air 36 may be supplied from HPC 18 instead of or in addition to fan bypass duct 15. For example, thermal control air 36 may be supplied from stage 5 (e.g., for cooling clearance control components) and/or stage 9 (e.g., for heating clearance control components) of HPC 18 via appropriate conduits. In some circumstances, thermal control air 36 supplied from fan bypass duct 15 may be cooler than thermal control air 36 supplied from HPC 18, which may provide greater heat transfer capacity in some embodiments.

Some example embodiments according to at least some aspects of the present disclosure may include air supply tube 42, air valve 44, and/or air supply inlet 19 that may be used in connection more than one system that requires thermal control air 36. For example, air supply inlet 19 may provide thermal control air 36 for both high pressure turbine ACC system 100 and an ACC system associated with LPT 24. For example, a Y fitting may be disposed downstream of air supply inlet 19, with a first branch of the Y comprising air supply tube 42 and a second branch of the Y supplying the LPT 24 ACC system.

Some example embodiments according to at least some aspects of the present disclosure may comprise a thermal control apparatus for gas turbine engine cases, and particularly for thermal control of clearances between turbine rotors and surrounding shrouds. Thermal control of an annular case section or ring may be provided by flowing a plurality (e.g., three) heat transfer fluid flowpaths in heat transfer communication with the section of engine casing. The flowpaths may substantially eliminate circumferential gradient in the mass flow rate weighted average temperature of the heat transfer fluid supplied by the three flowing fluid flowpaths. In some example embodiments, forward and aft rings may be cooled by three spray tubes mechanically located to create a relatively small stand-off distance between the spray tubes and the turbine case rings. Such placement may reduce the amount of fan air required to achieve desired clearances between turbine rotors and case shrouds, providing a substantial fuel burn benefit.

Some example embodiments according to at least some aspects of the present disclosure may be configured to impinge fan cooling air onto forward and aft turbine case rings by a plurality (e.g., three) spray tubes in individual sectors (e.g., in each of four 90 degree sectors). By use of appropriate mechanical assembly and attachment, the spray tubes may be located such that the distance between the spray tube and the turbine case ring is relatively small. This may allow turbine rotor clearance specifications to be met with minimal heat transfer fluid required. In addition, the fan inlet may be designed to utilize dynamic pressure converted to driving static pressure, which may improve the efficiency of the clearance control system.

Some example embodiments according to at least some aspects of the present disclosure may reduce operating clearances by reducing rubbing between rotor blade tips and corresponding stator assemblies using a relatively small amount of fan stream cooling air. This may improve engine performance, reduce the rate of engine performance deterioration, and improve component and module efficiency.

Some example embodiments according to at least some aspects of the present disclosure may provide reduced manufacturing cost, reduced weight, and/or reduced cooling air mass flow rate when compared with other active clearance control systems. Some of these improvements may contribute to improved fuel burn.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An active clearance control system for a gas turbine engine, the active clearance control system comprising:
   a generally circumferentially mounted spray tube comprising a plurality of impingement holes arranged to impinge thermal control air on a clearance control component of a case;
   wherein an individual impingement hole has an impingement hole diameter;
   wherein the individual impingement hole of the spray tube is spaced apart from the clearance control component by a stand-off distance; and
   wherein a ratio of the stand-off distance to the impingement hole diameter is less than about 8;
further comprising:
   a rigid mounting assembly substantially rigidly coupling the spray tube to the case and a sliding mounting assembly coupling the spray tube to the case while permitting limited relative movement between the spray tube and the case in a direction generally parallel with an engine axis;
   wherein the sliding mount is coupled to the case generally axially forward of the rigid mount.

2. The active clearance control system of claim 1, wherein the ratio of the stand-off distance to the impingement hole diameter is less than about 5.

3. The active clearance control system of claim 1, wherein the ratio of the stand-off distance to the impingement hole diameter is less than about 3.

4. The active clearance control system of claim 1,
wherein the first individual impingement hole of the spray tube is spaced apart from a circumferentially adjacent second individual impingement hole by an arc spacing; and
wherein a ratio of the arc spacing to the impingement hole diameter is less than about 15.

5. The active clearance control system of claim 1,
wherein the first individual impingement hole of the spray tube is spaced apart from a circumferentially adjacent second individual impingement hole by an arc spacing; and
wherein the ratio of the arc spacing to the impingement hole diameter is between about 2 and about 9.

6. The active clearance control system of claim 1,
wherein the first individual impingement hole of the spray tube is spaced apart from a circumferentially adjacent second individual impingement hole by an arc spacing; and
wherein the ratio of the arc spacing to the impingement hole diameter is between about 4 and about 7.

7. The active clearance control system of claim 1, wherein a pressure ratio across an individual impingement hole is greater than about 1.3.

8. The active clearance control system of claim 1, wherein a pressure ratio across an individual impingement hole is greater than about 1.4.

9. The active clearance control system of claim 1, wherein a pressure ratio across an individual impingement hole is about 1.5.

10. An active clearance control system for a gas turbine engine, the active clearance control system comprising:
a generally circumferentially mounted spray tube comprising a plurality of impingement holes arranged to impinge thermal control air on a clearance control component of a case;
wherein a first individual impingement hole has an impingement hole diameter;
wherein the first individual impingement hole is spaced apart from a circumferentially adjacent second individual impingement hole by an arc spacing; and
wherein a ratio of the arc spacing to the impingement hole diameter is less than about 15;
further comprising:
a rigid mounting assembly substantially rigidly coupling the spray tube to the case and a sliding mounting assembly coupling the spray tube to the case while permitting limited relative movement between the spray tube and the case in a direction generally parallel with an engine axis;
wherein the sliding mount is coupled to the case generally axially forward of the rigid mount.

11. The active clearance control system of claim 10, wherein the ratio of the arc spacing to the impingement hole diameter is between about 2 and about 9.

12. The active clearance control system of claim 10, wherein the ratio of the arc spacing to the impingement hole diameter is between about 4 and about 7.

13. The active clearance control system of claim 10, wherein a pressure ratio across an individual impingement hole is greater than about 1.3.

14. The active clearance control system of claim 10, wherein a pressure ratio across an individual impingement hole is greater than about 1.4.

15. The active clearance control system of claim 10, wherein a pressure ratio across an individual impingement hole is about 1.5.

16. An active clearance control system for a gas turbine engine, the active clearance control system comprising:
a generally circumferentially mounted spray tube comprising a plurality of impingement holes arranged to impinge thermal control air on a clearance control component of a case;
a rigid mounting assembly substantially rigidly coupling the spray tube to the case; and
a sliding mounting assembly coupling the spray tube to the case while permitting limited relative movement between the spray tube and the case in a direction generally parallel with an engine axis;
wherein the sliding mount is coupled to the case generally axially forward of the rigid mount;
wherein a first individual impingement hole has an impingement hole diameter;
wherein the first individual impingement hole is spaced apart from the clearance control component by a stand-off distance;
wherein the first individual impingement hole is spaced apart from a circumferentially adjacent second individual impingement hole by an arc spacing;
wherein a ratio of the stand-off distance to the impingement hole diameter is less than about 8; and
wherein a ratio of the arc spacing to the impingement hole diameter is less than about 15.

17. The active clearance control system of claim 16, wherein the ratio of the stand-off distance to the impingement hole diameter is less than about 3.

18. The active clearance control system of claim 16, wherein the ratio of the arc spacing to the impingement hole diameter is between about 4 and about 7.

19. The active clearance control system of claim 16, wherein the spray tube is at least partially constructed of a roll formed channel.

* * * * *